US006425124B1

(12) United States Patent
Tominaga et al.

(10) Patent No.: US 6,425,124 B1
(45) Date of Patent: Jul. 23, 2002

(54) RESOURCE ALLOCATION DEVICE FOR REDUCING THE SIZE AND RUN TIME OF A MACHINE LANGUAGE PROGRAM

(75) Inventors: Nobuki Tominaga; Akira Tanaka; Seiichi Urushibara, all of Kyoto (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 08/148,887

(22) Filed: Nov. 8, 1993

(51) Int. Cl.[7] .............................................. G06F 9/45
(52) U.S. Cl. ...................................... 717/146; 717/151
(58) Field of Search ....................... 364/DIG. 1, DIG. 2; 395/700; 717/146, 151

(56) References Cited

U.S. PATENT DOCUMENTS

| | | | | | |
|---|---|---|---|---|---|
| 4,571,678 | A | * | 2/1986 | Chaitin ........................ | 395/700 |
| 4,656,582 | A | * | 4/1987 | Chaitin et al. ............... | 364/300 |
| 4,734,854 | A | * | 3/1988 | Atshar ......................... | 395/700 |
| 5,202,975 | A | * | 4/1993 | Rasbold et al. .............. | 395/700 |
| 5,317,740 | A | * | 5/1994 | Sites ........................... | 395/700 |

OTHER PUBLICATIONS

Hsu et al, On the Minimization of Loads/Stores in Local Register Allocation, IEEE Transactions on Software Engineering, vol. 15 No. 10 Oct. 1989.*
LuQue et al, Heuristic Algorithms for Register Allocation, IEE Proceedings–E, vol. 139 No. 1 Jan. 1992.*
Wilson et al, Optimal Allocation of Multiport Memories in Data Path Synthesis, Circuits and Systems, 1989 IEEE Midwest Symposium.*
Huang et al, Two New Algorithms for Data Path Allocation, VLSI Technology, Systems and Applications Symposium, 1989.*
Chi et al, Register Allocation for GaAs Computer Systems, System Sciences, 1988 Annual Hawaii Intl. Conf. vol. 1, 1988, pp. 266–274.*
Bier et al, Gabriel: A Design Environment for DSP, IEEE Micro 10/90, V: 10 Issue: 5 pp. 28–45.*
Woo, A Global, Dynamic Register Allocation & Binding, Design Automation Conference, 1990 ACM/IEEE, pp. 505–510.*
Bhasker, Process Graph Analyzer: A Front End Tool for VHDL Behavioral Synthesis, System Sciences, 1988 Annual Hawaii Intl. Conf vol. 1, pp. 248–255.*
Hitchcock et al, A Method of Automatic Data Path Synthesis, 20th Design Automation Conference, 1983 pp. 484–489.*
Young et al, A Simulation Study of Architectural Data Queues and Prepare–to–Branch Instruction.*
Powell et al, Direct Synthesis of Optimized DSP Assembly Code From Signal Flow Block Diagrams, ICASSP '92, 1992 vol. 5 pp. V553–V556.*
Kapka, An Assembly Source Level Global Compactor for Digital Signal, ICASSP 90, pp. 1061–1064.*

* cited by examiner

Primary Examiner—Alvin Oberley
Assistant Examiner—Sue Lao
(74) Attorney, Agent, or Firm—Price and Gess

(57) ABSTRACT

The present invention discloses a resource allocation device comprising a pattern generation unit for generating every pattern of a live variable placing within a program portion subjected to resource allocation and a resource to which the live variable is allocated; an instruction extraction unit for extracting from an instruction storage an instruction sequence corresponding to a combination of an operation placing within the program portion and the resource to which a variable in the operation is allocated, and generating a program comprising the extracted instruction sequences; a cost table for memorizing each instruction sequence and cost thereof which represents the number of execution clocks taken in execution of the instruction sequence; a cost detection unit for detecting the cost of each instruction sequence included in the program from the cost table; a total cost detection unit for summing the cost of each instruction sequence detected by the cost detection unit for each pattern generated by the pattern generation unit; and a best pattern decision unit for deciding the pattern with the lowest cost in all the patterns generated by the pattern generation unit.

11 Claims, 7 Drawing Sheets

(a) resource allocation program portion int  a, b, c, d b = d + 1 0 0 ;

c = b * 2 ;

a = b + 3 ;

c = c * 3 5 0 ;

d = a - 2 0

(b) live range (c) pattern

| a | b | c | d | |
|---|---|---|---|---|
| Reg1 | Reg2 | Mem1 | Mem2 | · · · pattern P1 |
| Reg1 | Mem1 | Reg2 | Mem2 | · · · pattern P2 |
| Reg1 | Mem1 | Mem2 | Reg2 | · · · pattern P3 |
| Mem1 | Reg1 | Reg2 | Mem2 | |
| Mem1 | Reg1 | Mem2 | Reg2 | |
| Mem1 | Mem2 | Reg1 | Reg2 | |

.

.

.

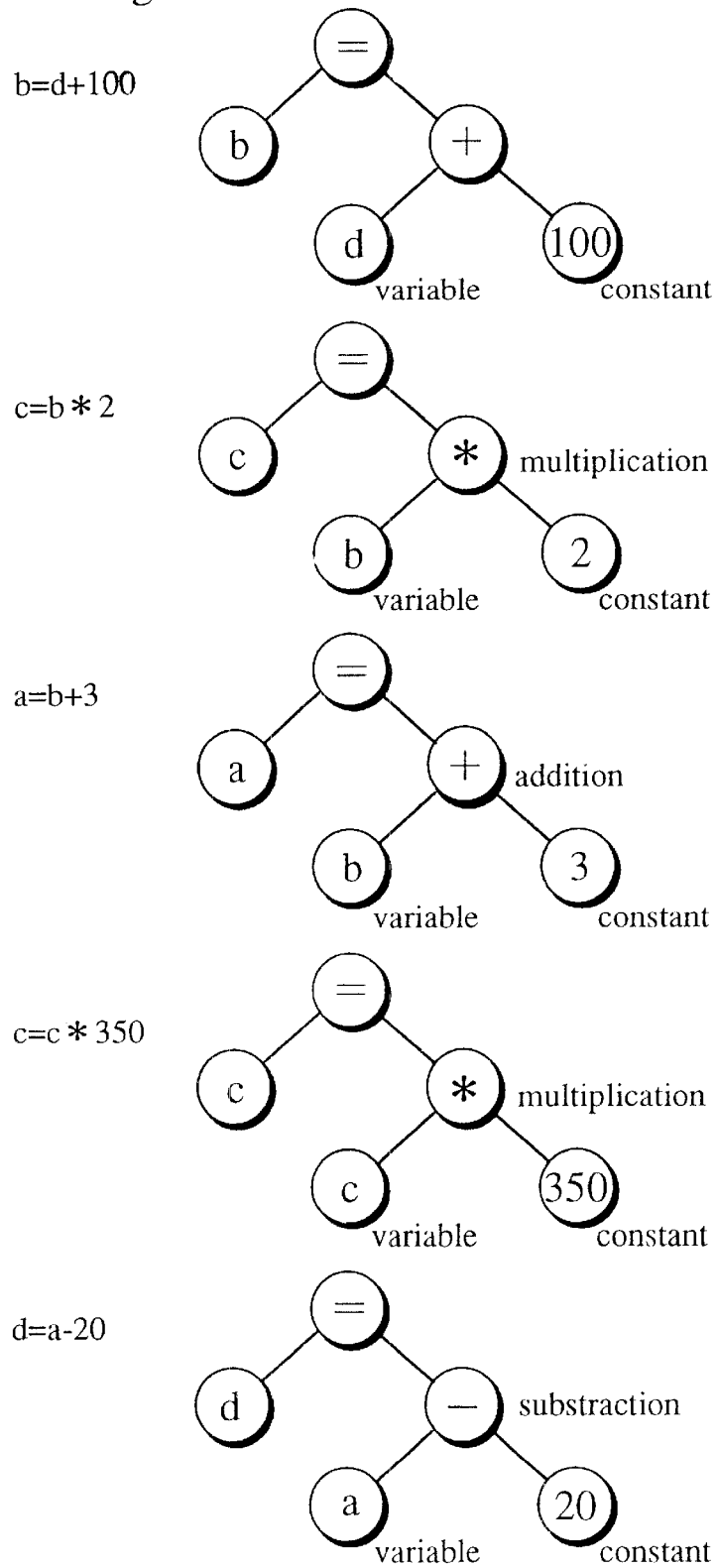

Fig.5

| detection items | | | | instruction sequence |
|---|---|---|---|---|
| action type | variable type | operand type | operation result storage | instruction sequence |
| addition | 32-bit integer | Reg2 constant | Reg1 | ADD Reg2, constant |
| | 32-bit integer | | | MOV Reg1, Reg2 |
| multiplication | 32-bit integer | Reg2 constant | Reg1 | MUL Reg2, constant |
| | 32-bit integer | | | MOV Reg1, Reg2 |
| subtraction | 32-bit integer | Reg2 constant | Reg1 | SUB Reg2, constant |
| | 32-bit integer | | | MOV Reg1, Reg2 |
| addition | 32-bit integer | Reg1 constant | Mem1 | ADD Reg1, constant |
| | 32-bit integer | | | MOV Mem1, Reg1 |
| multiplication | 32-bit integer | Reg1 constant | Mem1 | MUL Reg1, constant |
| | 32-bit integer | | | MOV Mem1, Reg1 |
| subtraction | 32-bit integer | Reg1 constant | Mem1 | SUB Reg1, constant |
| | 32-bit integer | | | MOV Mem1, Reg1 |
| addition | 32-bit integer | Mem1 constant | Reg1 | ADD Mem1, constant |
| | 32-bit integer | | | MOV Reg1, Mem1 |
| multiplication | 32-bit integer | Mem1 constant | Reg1 | MUL Mem1, constant |
| | 32-bit integer | | | MOV Reg1, Mem1 |
| subtraction | 32-bit integer | Mem1 constant | Reg1 | SUB Mem1, constant |
| | 32-bit integer | | | MOV Reg1, Mem1 |

Fig.6

| instruction sequence | number of cycles |
|---|---|
| MOV Reg2, Reg1 | 1 |
| MOV Reg1, Reg2 | 1 |
| MOV Mem1, Reg1 | 2 |
| MOV Mem1, Reg2 | 2 |
| ADD Reg1, constant | 2 |
| MOV Reg1, constant | 1 |
| MUL Reg1, constant | 3 |
| SUB Reg1, constant | 2 |
| ADD Mem1, constant | 3 |
| MOV Mem1, constant | 2 |
| MUL Mem1, constant | 5 |
| SUB Mem1, constant | 3 |
| ADD Reg2, constant | 2 |
| MOV Reg2, constant | 1 |
| MUL Reg2, constant | 3 |
| SUB Reg2, constant | 2 |

Fig. 7 pattern P1

| | q1 | r1 |
|---|---|---|
| MUL Mem2, constant | 3 | |
| MOV Reg2, Mem2 | 2 | |
| MUL Reg2, constant | 3 | |
| MOV Mem1, Reg2 | 2 | |
| ADD Reg2, constant | 2 | |
| MOV Reg1, Reg2 | 1 | |
| MUL Mem1, constant | 5 | |
| SUB Reg1, constant | 2 | |
| MOV Mem2, Reg1 | 2 | | total cost 22   s1 pattern P2

| | q2 | r2 |
|---|---|---|
| ADD Mem2, constant | 3 | |
| MOV Mem1, Mem2 | 2 | |
| MUL Mem1, constant | 5 | |
| MOV Mem2, Mem1 | 2 | |
| ADD Mem1, constant | 3 | |
| MOV Reg1, Mem1 | 2 | |
| MUL Reg2, constant | 3 | |
| SUB Reg1, constant | 2 | |
| MOV Mem2, Reg1 | 2 | | total cost 24   s2 pattern P3

| | q3 | r3 |
|---|---|---|
| ADD Reg2, constant | 2 | |
| MOV Mem1, Reg2 | 2 | |
| MUL Mem1, constant | 5 | |
| MOV Mem2, Mem1 | 2 | |
| ADD Mem1, constant | 3 | |
| MOV Reg1, Mem1 | 2 | |
| MUL Mem2, constant | 5 | |
| SUB Reg1, constant | 2 | |
| MOV Reg2, Reg1 | 1 | | total cost 24   s3 pattern P1   total cost 22 pattern P2   total cost 24 pattern P3   total cost 24

RESOURCE ALLOCATION DEVICE FOR REDUCING THE SIZE AND RUN TIME OF A MACHINE LANGUAGE PROGRAM

BACKGROUND OF THE INVENTION (1) Field of the Invention

The present invention relates to a resource allocation device employed by a computer to allocate a variable to a resource when translating a source program into an object program.

(2) Description of Related Art

Development of a program has been promoted by describing a program in a high-level language such as a C language. A compiler translates a source program from a high-level language into a machine language which can be understood by a target computer.

A source program employs variables to hold numeric values to be computed in an operation or to hold operation results. Variables are defined by a programmer depending on the needs; or, they are generated by a compiler so that internal processing will be facilitated. Only a required number of the generated variables will be used.

A machine language program, on the other hand, operates a register or a memory to hold numeric values to be computed in an operation or to hold operation results. Both a register and a memory are hardware, so that the number of registers and memories which can be employed at each source program is limited.

When translating a source program into a machine language program, all the variables included in the source program need to be allocated to either a register or a memory. A conventional compiler operates a resource allocation device to allocate each variable to either a register or a memory.

A register and a memory are also called resources defined in a program and are referred to as "alive" until their final references in the program.

Generally the number of available registers is small, so that the compiler implements the best use thereof by allocating a frequently used variable to a register. To be concrete, the compiler determines the frequency each variable used in a source program, and divides the frequency of appearance of the variable by its live range, which indicates how long the variable is alive. Then, the variable with a large dividing result will be allocated to a register while the variable with a small dividing result will be allocated to a memory.

According to the conventional compiler, however, size and run time of the translated machine language program are not considered when allocating a variable to a resource. That is, when allocating a variable to either a register or a memory, an operation including the variable and an instruction sequence replacing the operation are not considered; consequently, size of the machine language program including a plurality of the instruction sequences tends to be large. As a result, run times of such machine language programs are often long.

For example, it is assumed that a target machine manipulates operand at registers. With the allocation by the conventional resource allocation device, a variable x representing the operand in the machine language program may be allocated to a memory. In this case, a transfer instruction which directs transfer of the content of the memory to the register must be included in the machine language program. If a number of the transfer instructions are included in the machine language program, size of the program will be expanded and run time thereof will be extended by the transfer instructions.

SUMMARY OF THE INVENTION

Accordingly, it is an object of the present invention to provide a resource allocation device for reducing run time and size of a machine language program.

The above object may be fulfilled by a resource allocation device employed by a compiler for translating a high-level language program or a program translated from the high-level language program by a compiler for its internal processing, into a machine language of a target machine, the resource allocation device allocating a variable included in a resource allocation portion of the program to a resource such as a register or a memory, the resource allocation portion being subjected to the resource allocation, the resource allocation device comprising a variable holding unit for holding all live variables placed within the resource allocation portion, a pattern generation unit for generating every pattern of the resource and each variable held by the variable holding unit, the variable to be allocated to the resource, an instruction sequence holding unit for holding an instruction sequence corresponding to each combination of an operation and the resource, the instruction sequence written in an assembly language and/or a macro language, an instruction extraction unit for extracting the instruction sequence for each pattern generated by the pattern generation unit in accordance with each operation placed within the resource allocation portion and the resource to which the variable in the operation is allocated, and generating a program corresponding to the resource allocation portion, the program comprising the extracted instruction sequences, a cost table for holding the instruction sequence and a cost thereof representing the number of execution clocks taken in execution of the instruction sequence, a cost detection unit for detecting from the cost table the cost of each instruction sequence included in each program generated by the instruction extraction unit, a total cost computation unit for computing a total cost of each pattern generated by the pattern generation unit as referring to the cost of each instruction sequence detected by the cost detection unit, and a best pattern decision unit for deciding the pattern with the lowest cost in the patterns generated by the pattern generation unit as referring to the total cost of each pattern.

The pattern generation unit may be comprised of a first variable selection unit for selecting all the variables held by the variable holding unit unless a predetermined direction is given by a user; a variable evaluation unit for obtaining a variable evaluation value of each live variable by dividing the number of the operations referring to/defining the live variable by its live range; a second variable selection unit for arranging the variables by the variable evaluation values and selecting a predetermined number of the variables which starts with a first variable with the largest variable evaluation value and ends with a final variable so that the number of the selected variables including the first and the final variables coincides with the predetermined number; and a generation unit for generating every pattern of the variables selected by the first variable selection unit or the second variable selection unit and the resource corresponding to each of the variables.

The second variable selection unit may be comprised of a computation unit for computing the predetermined number by doubling the number of the registers employed by the target machine; a first selection unit for selecting all the variables from the resource allocation portion when the number of the selected variables is the predetermined number or smaller than the same; and a second selection unit for arranging the variables by the variable evaluation values and selecting the predetermined number of variables which starts with a first variable with the largest evaluation value and ends with a final variable so that the number of the selected variables including the first and the final variables coincides with the predetermined number computed by the computation unit when the number of the variables placed within the resource allocation portion is larger than the predetermined number.

The instruction sequence holding unit may hold the instruction sequence which corresponds to a combination of an action type, a variable type, an operand, and a storage in which the action type, the variable type, and the operand are included in the operation while results of the operation are stored into the storage; and an instruction extraction unit may extract the instruction sequence for each pattern generated by the pattern generation unit as referring to the action type, the variable type, and the operand, all of which are included in the operation placed within the resource allocation portion as well as referring to a resource to which the variable in the operation is allocated, and generate a program which includes the extracted instruction sequences.

The cost table may hold the instruction sequence and cost thereof, the cost representing memory size needed by the instruction sequence on a memory and/or the number of execution clocks taken in execution of the instruction sequence.

The above object may be fulfilled by a resource allocation device employed by a compiler for translating a high-level language program or a program translated from the high-level language program by a compiler for its internal processing, into a machine language of a target machine, the resource allocation device allocating a variable included in a resource allocation portion of a programming language program to a resource such as a register or a memory, the resource allocation portion being subjected to the resource allocation, the resource allocation device comprising a variable holding unit for holding all live variables placed within the resource allocation portion, a pattern generation unit for generating every pattern of the resource and the variable held by the variable holding unit, the variable to be allocated to the resource, a holding unit for holding an instruction sequence corresponding to each combination of an operation and the resource as well as a cost of the instruction sequence, the instruction sequence written in an assembly language and/or a macro language, an extraction unit for extracting the instruction sequence for each pattern generated by the pattern generation unit and cost thereof in accordance with each operation placed within the resource allocation portion and the resource to which the variable in the operation is allocated, and generating a program corresponding to the resource allocation portion, the program comprised of the extracted instruction sequences, a total cost computation unit for computing a total cost of each pattern generated by the pattern generation unit in accordance with the cost extracted by the extraction unit, and a best pattern decision unit for deciding a pattern with the lowest total cost in the patterns generated by the pattern generation unit as referring to the total cost of each pattern computed by the total cost computation unit.

The pattern generation unit may be comprised of a first variable selection unit for selecting all the variables held by the variable holding unit unless a predetermined instruction is provided by a user, a variable evaluation unit for obtaining a variable evaluation value of each live variable placed within the resource allocation portion by dividing the number of the operations referring to/defining the live variable by its live range indicating how long it is alive, a second variable selection unit for arranging the variables by the variable evaluation values and selecting a predetermined number of the variables which starts with a first variable with the largest variable evaluation value and ends with a final variable so that the number of the selected variables including the first and the final variables coincides with the predetermined number, and a generation unit for generating every pattern of each variable selected by one of the first variable selection unit or the second variable selection unit as well as the resource to which each variable is allocated.

The second variable selection unit may be comprised of a computation unit for computing the predetermined number by doubling the number of the registers assigned to the target machine, a first selection unit for selecting all the variables placed within the resource allocation portion when the number of the selected variables is the predetermined number computed by the computation unit or smaller than the same, and a second selection unit for arranging the variables by the variable evaluation values and selecting the predetermined number of variables which starts with a first variable with the largest evaluation value and ends with a final variable so that the number of the selected variables including the first and the final variables coincides with the predetermined number when the number of the variables placed within the resource allocation portion is larger than the predetermined number computed by the computation unit.

The holding unit may hold the instruction sequence and cost thereof, the instruction sequence being written in an assembly language and/or a macro language and corresponding to a combination of an action type, a variable type, an operand, and a storage in which the action type, the variable, and the operand are included in the operation while results of the operation are stored into the storage; and the extraction unit may extract the instruction sequence for each pattern generated by the pattern generation unit as referring to the action type, the variable type, and the operand, all of which are included in each operation placed within the resource allocation portion, as well as referring to the resource to which the variable in the operation is allocated, and generate a program corresponding to the resource allocation portion, the program comprised of the extracted instruction sequences.

The holding unit may hold the instruction sequence and its cost which represents memory size needed by the instruction sequence on a memory and/or the number of execution clocks taken in execution of the instruction sequence.

According to the present invention, an instruction sequence which replaces an operation is stored into an instruction storage and the number of cycles and/or memory size taken in execution of each instruction sequence is recorded in a cost table. A pattern of a resource and a variable allocated to the resource is generated, and as referring to the cost table a total cost of operations which are placed within a part of a program subjected to resource allocation is computed for each pattern. Consequently, the pattern with the lowest cost is detected, and resource allocation is conducted in accordance with the detected pattern. As a result, the size and the run time of the machine language program will be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows expression trees generated by an expression tree generation unit;

FIG. 5 shows content of a template;

FIG. 6 shows instruction sequences selected by an instruction selection unit, cost of each instruction sequence detected by a detection unit, and total cost computed by a total cost computation unit for each pattern generated by a pattern generation unit; and FIG. 7 shows content of a cost table.

DESCRIPTION OF THE PREFERRED EMBODIMENT

Figure 1:
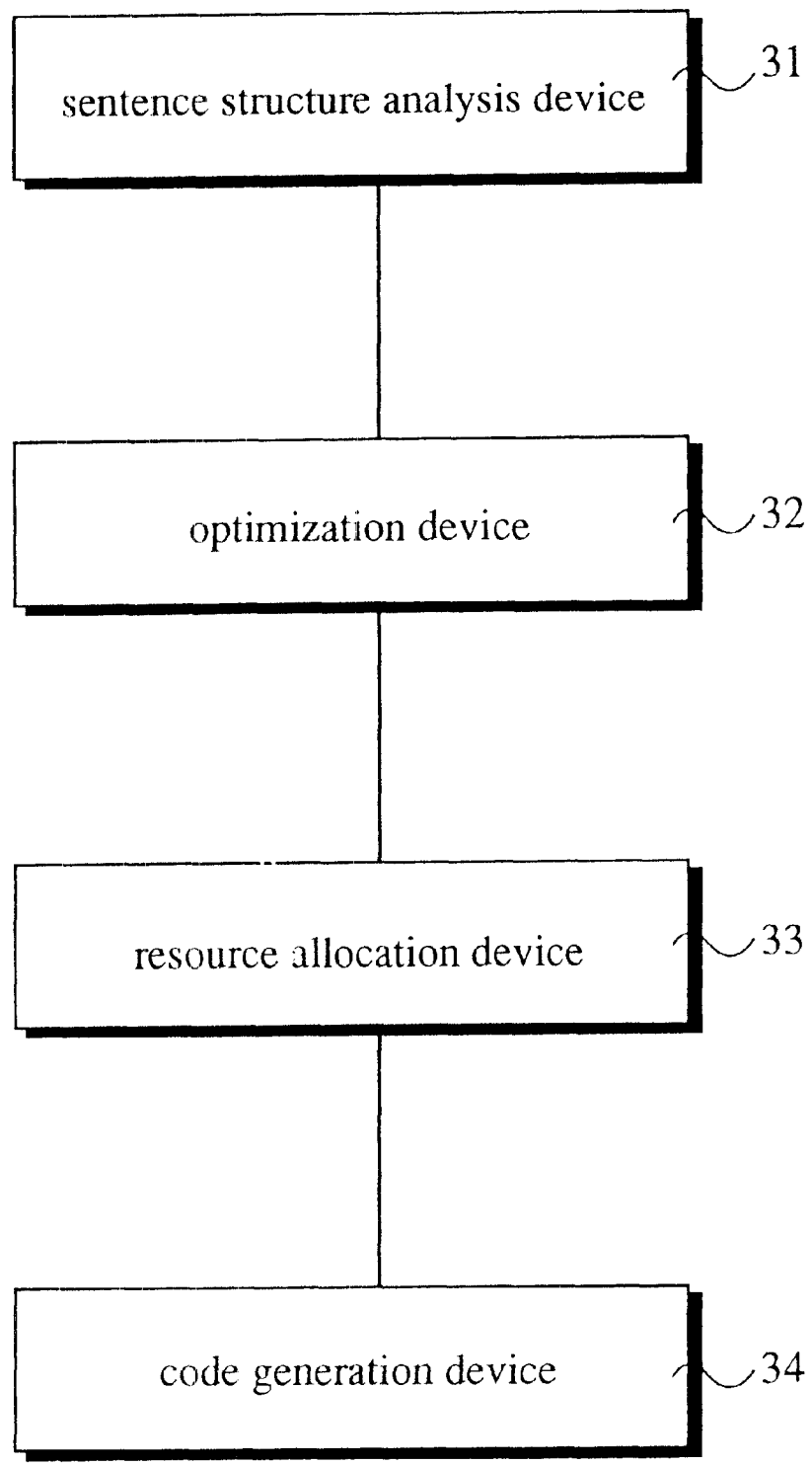
FIG. 1 is a block diagram depicting construction of a compiler in an embodiment of the present invention.

Construction of a compiler including a resource allocation device in an embodiment of the present invention will be described as referring to FIG. 1. The compiler in the figure comprises a sentence structure analysis device 31, an optimization device 32, a resource allocation device 33, and a code generation device 34.

The sentence structure analysis device 31 analyzes sentence structure of a source program. The sentence structure analysis will result in an intermediate language program or the like.

The optimization device 32 optimizes an intermediate language program to reduce size and run time of a machine language program generated from the intermediate language program. Also the optimization device 32 extracts a program portion subjected to resource allocation by the resource allocation device 33.

The resource allocation device 33 allocates the program portion extracted by the optimization device 32 to resources of a target machine, including a register and a memory.

The code generation device 34 translates the optimized intermediate language program into a machine language of a target machine in accordance with resource allocation by the resource allocation device 33, and outputs the machine language program as an object file.

Figure 2:
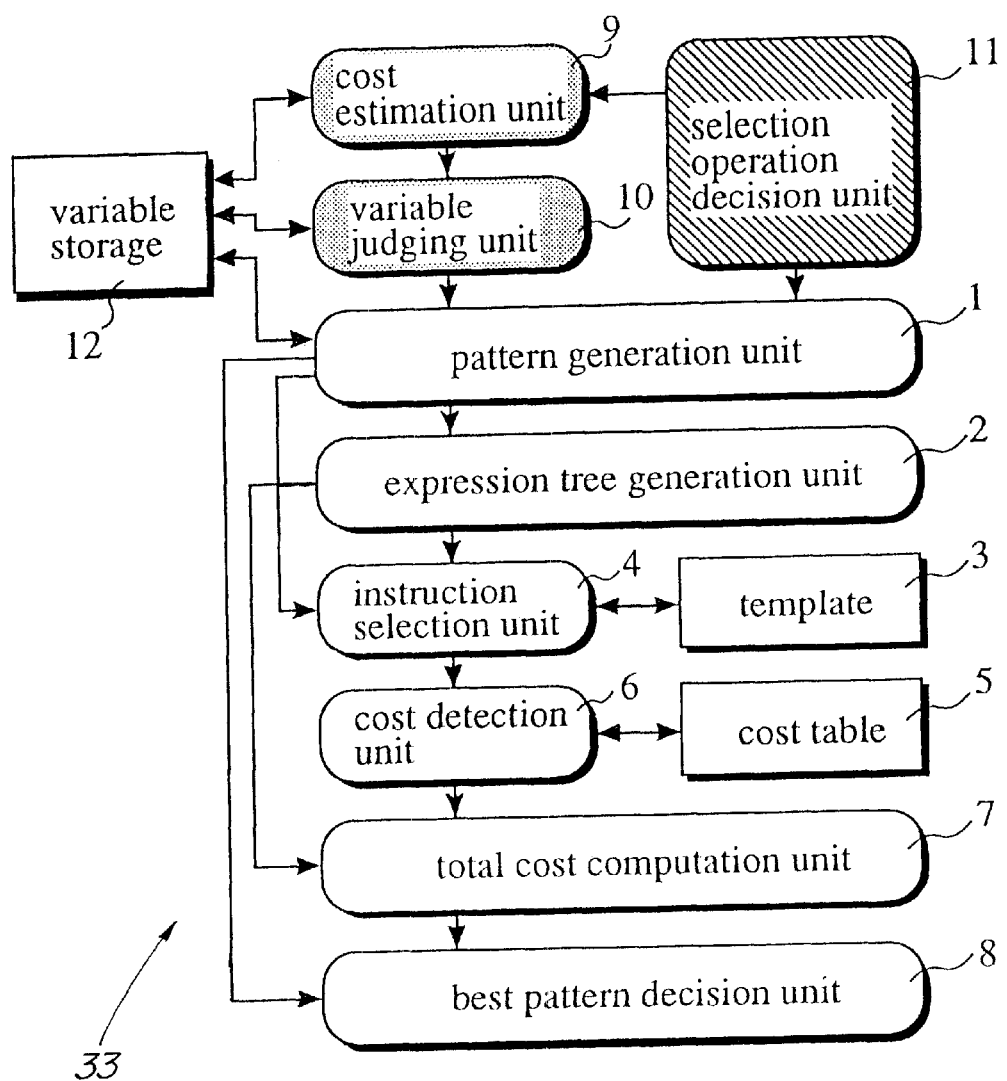
FIG. 2 is a block diagram depicting construction of a resource allocation device in an embodiment of the present invention.

The construction of the resource allocation device 33 will be described with reference to FIG. 2. The resource allocation device in the figure comprises an allocation pattern generation unit 1, an expression tree generation unit 2, a template 3, an instruction selection unit 4, a cost table 5, a cost detection unit 6, a total cost computation unit 7, a best pattern decision unit 8, a cost estimation unit 9, a variable judging unit 10, a selection operation decision unit 11, and a variable storage 12.

Figure 3:
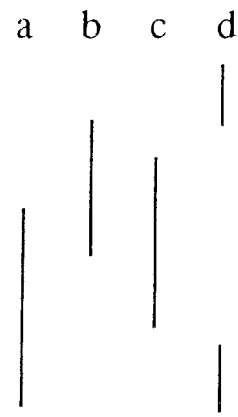
FIG. 3(a), FIG. 3(b), and FIG. 3(c) show a program portion to be subjected to resource allocation, a live range of each variable, and a pattern generated by a pattern generation unit.

The allocation pattern generation unit 1 generates all conceivable patterns of: (1) variables in the variable storage 12, and (2) resources. For example, assume that a program in FIG. 3(a) is subjected to resource allocation. The program includes variables a, b, c, and d. The variables a, b, and c are defined by a programmer, while the variable d is employed by the compiler internally. Also, it is assumed that the target machine has two registers. In this case, the allocation pattern generation unit 1 generates all allocation patterns of the above variables and the resources. The resources comprise memories and/or registers. As shown in FIG. 3(c), six allocation patterns are generated by the allocation pattern generation unit 1 from the four variables and the two registers.

The expression tree generation unit 2 generates an expression tree for each of the operations included in the program portion extracted by the optimization device 32. An operation herein represents a step including a variable. The expression tree generation unit 2 generates an equal sign node, an operator node, a variable node, and a constant node included in each operation. Then, the variable node at the left of the equal sign node is connected to the left of the equal sign node with an edge. If there is an operator at the right of the equal sign in the operation, the operator node is connected to the right of the equal sign node with an edge. Then, the node of a variable or a constant at the right of the operator in the operation is connected to the right of the operator node with an edge. Next, the node of a variable or a constant at the left of the operator in the operation is connected to the left of the operator with an edge. If there is no operator at the right of the equal sign in the operation, on the other hand, the constant node is connected to the right of the equal sign node with an edge. Repeating these operations, expression trees corresponding to all the operations within the program portion are generated. FIG. 4 shows expression trees generated by the expression tree generation unit 2 from the program portion in FIG. 3(a). To be noted, if the above variables are pointer variables, the expression tree generation unit 2 will generate a node of a pointer operator and connect it to a node of a pointer variable. Thus, the node of the pointer operator and the node of the variable in pair are considered to be one variable on the memory.

The template 3 shows a correspondence between detection items and corresponding instruction sequences. FIG. 5 shows an example of the template 3 with the second to first system (in which a second operand will be applied to a first operand) on a target machine constructed for a 2 operand system. Each detection item has an action type of either addition, subtraction, multiplication, or division, a variable type being of either an 8 bit integer type, a 16 bit integer type, a 32 bit integer type, a single precision floating-point number type, or a double precision floating-point number type; an operand type being of either a variable in a memory, a variable in a register, a constant, or a combination thereof; and a storage of either a register or a memory. The action type and the variable type are determined by the expression tree generation unit 2; and the operand type and the operand result storage are determined by referring to allocation patterns generated by the pattern generation unit 1. The instruction sequences are written in either an assembly language of a macro language, and this corresponds to an expression tree generated by the expression tree generation unit 2. There may be a plurality of assembly language instructions or macro language instructions which correspond to a single instruction sequence.

The instruction sequence selection unit 4 examines a specific expression tree generated by the expression tree generation unit 2 and a specific allocation pattern generated by the allocation pattern generation unit 1. The instruction sequence selection unit 4 then picks the instruction sequence from the template 3 that corresponds to that expression tree and that generated allocation pattern.

That is, the instruction sequence selection unit 4 detects the action type, the variable type, and the operand type from one of the expression trees. The detected action type, variable type, and operand type are then employed as detection items for that expression tree when examining the template 3. Then, the instruction sequence selection unit 4 detects the variables for holding the operand and the operation result in that expression tree. The instruction sequence selection unit 4 then uses one of the allocation patterns to determine, for that allocation pattern, the resources to which the variables for the operand and the operation result storage are allocated. From the template 3, the instruction sequence selection unit 4 finds the instruction sequence corresponding to the action type, the variable type, the operand type, and the resources dictated by the allocation pattern.

Repeating the above, instruction sequences are generated for the rest of the expression trees for the same allocation pattern. This entire process of selecting instruction sequences is then repeated for all of the other allocation patterns. Groups of instruction sequences q1 through q3 in FIG. 7 correspond to allocation patterns p1 through p3, respectively. Thus, the instruction sequences of each group are selected from the template 3 by referring to the expression tress and allocation patterns.

The cost table 5 shows instruction sequences and the number of execution clock cycles required for execution of each instruction sequence. FIG. 7 shows an example of the cost table.

The cost detection unit 6 detects the number of execution clock cycles for each of the instruction sequences extracted by the instruction sequence selection unit 4 by referring to the cost table 5.

The total cost computation unit 7 figures out total cost of each allocation pattern generated by the allocation pattern generation unit 1 by summing the number of clock cycles detected by the cost detection unit 6.

The best allocation pattern detection unit 8 detects the allocation pattern with the lowest total cost in all of the allocation patterns generated by the pattern generation unit 1.

The cost estimation unit 9 estimates the operation cost of the program portion subjected to resource allocation by obtaining estimated costs of variables placed within the program portion. An estimated cost of each variable is detected by dividing the number of operations referring to/defining each live variable by its live range. Also, it can be detected in accordance with the nesting level of a loop employing the variable.

The variable judging unit 10 refers to the estimated cost estimated by the cost estimation unit 9; detects a variable with a large estimated cost; and extracts and stores that variable into the variable holding unit 12. To be concrete, the variable judging unit 10 arranges the variables by estimated cost and extracts the variables with large estimated costs. The extraction starts with the variable with the largest estimated cost and continues until the number of the extracted variables becomes twice as large as the number of registers.

According to a condition observed at the start of the compile operation, the selection operation decision unit 11 decides if the cost estimation unit 9 and the variable judging unit 10 are to be operated. If the selection operation decision unit 11 decides that the cost estimation unit 9 and the variable judging unit 10 are not to be operated, all the variables placed within the program portion subjected to resource allocation are extracted and are stored into the variable holding unit 12. To be concrete, if the number of the variables within the program portion is extremely large, the number of the patterns to be generated by the pattern generation unit 1 will be so large that the resource allocation device 33 cannot handle them. To prevent this situation, the selection operation decision unit 11 determines to operate the cost estimation unit 9 and the pattern selection unit 10 by referring to the condition at the start of the compile operation. On the other hand, if the number of the variables placed within the program portion is a predetermined number or smaller than the same, the cost estimation unit 9 and the pattern selection unit 10 will not operate even when they were directed to operate at the start of the compile operation; and stores all the variables within the program portion into the variable holding unit 12.

The variable holding unit 12 holds the variables extracted by the variable judging unit 10 and the pattern selection unit 13 from the program portion subjected to resource allocation.

Operation of the resource allocation device with the above construction will be described.

(1) The selection operation decision unit 11 starts the cost estimation unit 9 and the allocation pattern generation unit 1. In order to implement high-speed resource allocation, the allocation pattern selection is executed during development or debug operation even when the number of the variables within the program portion is small. At the final compile operation after the debug operation, the allocation pattern selection is not executed so that highly accurate resource allocation will be implemented.

The resource allocation operation will be forwarded to (2) if the selection operation decision unit 11 decides to operate the allocation pattern selection; otherwise, it will be forwarded to (4).

(2) The cost estimation unit 9 obtains the cost of each variable placed within the program portion by referring to its live range. The estimation cost of each variable placed within the program portion in FIG. 3(a) is figured out herein by referring to its live range shown in FIG. 3(b).

(3) According to the estimation cost by the cost estimation unit 9, the variable judging unit 10 takes variables with low estimation costs away from the variable holding unit 12.

(4) The allocation pattern generation unit 1 generates allocation patterns from the variables that survived the allocation pattern selection and resources corresponding to each of the variables. Otherwise, the allocation pattern generation unit 1 generates allocation patterns from all of the variables and resources corresponding to each of the variables. It is assumed herein that the allocation pattern selection is not operated so that the allocation patterns are generated using all the variables. Examples of the allocation patterns generated by the allocation pattern generation unit 1 are shown in FIG. 3(c).

(5) The expression tree generation unit 2 generates an expression tree which corresponds to each operation within the program portion subjected to resource allocation. FIG. 4 shows the expression trees generated by the expression tree generation unit 2 that correspond to the operations in the program portion shown in FIG. 3(a).

(6) The instruction sequence selection unit 4 examines the template 3 for each of the expression trees generated by the expression tree generation unit 2 and for each of the allocation patterns generated by the allocation pattern generation unit 1. For convenience, only three allocation patterns p1 through p3 in FIG. 3(c) are employed herein. By examining the template 3 for the expression trees in FIG. 4 and the allocation patterns p1 through p3, the instruction sequence selection unit 4 detects groups of instruction sequences q1 through q3, each of which corresponds to each of the allocation patterns.

(7) The cost detection unit 6 detects from the cost table the number of clock cycles for each of the instruction sequences selected by the instruction sequence selection unit 4. For each of the groups of instruction sequences q1–q3, a number of clock cycles in FIG. 6 are detected by the cost detection unit 6.

(8) The total cost computation unit 7 detects the cost of each allocation pattern generated by the allocation pattern generation unit 1 by summing the number of clock cycles detected by the cost detection unit 6. For the patterns p1 through p3 in FIG. 3(*c*), the total cost computation unit 7 figures out costs s1 through s3, respectively, by summing the number of clock cycles in FIG. 6.

(9) The best allocation pattern detection unit 8 detects the best allocation pattern for each group of instruction sequences by referring to the total cost computed by the total cost computation unit 7. The best allocation pattern has the lowest total cost therein. In the example of FIG. 7, the best allocation pattern detection unit 8 detects the allocation pattern p1 to be the best pattern by referring to the total costs s1 through s3.

Thus, according to the presently preferred embodiment, each variable is allocated to a specific resource to minimize the total cost of the group of instruction sequences.

Construction of the resource allocation device may be modified within the scope of the present invention. For example, each cost at the cost table may be determined by size of the area in the memory corresponding to an instruction sequence rather than the number of clock cycles.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included herein.

What is claimed is:

1. A resource allocation device for use by a compiler, the resource allocation device for translating a high-level language program or an intermediate language program into a machine language of a target machine, the resource allocation device performing resource allocation by allocating variables of a number of operations included in a program portion of the program to resources such as registers and memories, the resource allocation device comprising:

variable holding means for holding the variables included in the program portion;

allocation pattern generation means for generating allocation patterns, each allocation pattern defining a different allocation of the variables to the resources;

instruction sequence holding means for holding instruction sequences for different combinations of the operations and the resources, each instruction sequence corresponding to one of the operations and written in an assembly language and/or a macro language;

instruction sequence extraction means for extracting from the instruction sequence holding means instruction sequences, a number of instruction sequences equal to the number of operations being extracted for each allocation pattern, the instruction sequence extracting means generating, for each allocation pattern, a program which corresponds to the program portion and which comprises extracted instruction sequences;

a cost table for holding both the extracted instruction sequences and a corresponding cost for each extracted instruction sequence, each cost representing a number of execution clock cycles required for execution of the corresponding extracted instruction sequence;

cost detection means for detecting, from the cost table, the cost of each extracted instruction sequence;

total cost computation means for computing a total cost of each allocation pattern by adding the costs of the number of extracted instruction sequences for the allocation pattern; and best pattern determining means for determining an allocation pattern with a lowest cost by referring to the total cost of each allocation pattern, the resource allocation thereby being performed in accordance with the determined allocation pattern.

2. The resource allocation device of claim 1, wherein the allocation pattern generation means is comprised of:

first variable selection means for selecting all of the included variables, if a predetermined instruction for high-speed resource allocation is given by a user;

variable evaluation means for obtaining a variable evaluation value of each included variable by dividing a number of the operations referring to the included variable by the variable's life, which defines a quantity of operations from a first operation defining the included variable to a second operation making a final reference to the included variable;

second variable selection means for arranging the included variables by the variable evaluation values and selecting a predetermined number of the included variables which starts with a first included variable having a largest variable evaluation value and ends with a final included variable so that the number of the selected included variables including the first and the final variables coincides with the predetermined number; and wherein the allocation pattern generation means generates allocation patterns of the resources and the predetermined number of variables selected by the second variable selection means.

3. The resource allocation device of claim 2, wherein the second variable selection means is comprised of:

computation means for computing the predetermined number by doubling a number of registers employed by the target machine;

first selection means for selecting all included variables from the resource allocation portion when a number of the selected included variables is equal to or smaller than the predetermined number; and second selection means for arranging the included variables by the variable evaluation values and selecting the predetermined number of included variables when a number of the included variables is larger than the predetermined number.

4. The resource allocation device of claim 1, wherein the instruction sequence holding means holds an instruction sequence which corresponds to a combination of an operation type, a variable type, an operand, and a storage, and wherein the operation type, the variable type, and the operand are included in an operation of the held instruction sequence and results of the operation are stored into the storage, and wherein the instruction sequence extraction means extracts from the instruction sequence holding means instruction sequences for each allocation pattern by referring to: (1) an operation type, a variable type, and an operand, all of which are included in the corresponding operations in the program portion, and (2) resources to which the included variables in the corresponding operations are allocated.

5. The resource allocation device of claim 1, wherein the cost table holds the extracted instruction sequences and costs thereof, the cost of each extracted instruction sequence representing a memory size needed by that extracted instruction sequence in a memory and/or the number of execution clock cycles required for execution of the extracted instruction sequence.

6. A resource allocation device for use by a compiler, the resource allocation device for translating a high-level language program or an intermediate language program into a machine language of a target machine, the resource allocation device performing resource allocation by allocating variables of a number of operations included in a program portion of a programming language program to resources such as registers or memories, the resource allocation device comprising:

variable holding means for holding the variables included in the program portion;

allocation pattern generation means for generating allocation patterns, each allocation pattern comprising a combination of: (1) the resources, and (2) the variables to be allocated to the resources;

holding means for holding instruction sequences and costs associated therewith, each held instruction sequence corresponding to a different combination of the operations and the resources, each instruction sequence corresponding to one of the operations and written in an assembly language and/or a macro language;

extraction means for extracting from the instruction sequence holding means both instruction sequences and associated costs, a number of instruction sequences and associated costs equal to the number of operations being extracted for each allocation pattern, based upon: (1) the corresponding operations, and (2) resources to which the included variables are allocated, the instruction allocation extracting means generating for each allocation pattern a program which corresponds to the program portion and which comprises the extracted instruction sequences;

total cost computation means for computing a total cost of each allocation pattern, based upon the extracted costs associated with the number of extracted instruction sequences corresponding to each allocation pattern; and test pattern determining means for determining an allocation pattern with a lowest total cost of the allocated patterns by referring to the total cost of each allocated pattern, the resource allocation thereby being conducted in accordance with the determined allocation pattern.

7. The resource allocation device of claim 6, wherein the allocation pattern generation means is comprised of:

first variable selection means for selecting all of the included variables, if a predetermined instruction for high-speed resource allocation is provided by a user;

variable evaluation means for obtaining a variable evaluation value of each included variable by dividing a number of the operations referring to the included variable by the variable's life, which expresses a quantity of operations from a first operation defining the included variable to a second operation making a final reference to the included variable;

second variable selection means for arranging the included variables by the variable evaluation values and selecting a predetermined number of the included variables which starts with a first included variable having a largest variable evaluation value and ends with a final included variable so that the number of the selected included variables including the first and the final variables coincides with the predetermined number; and wherein the allocation pattern generation means generates allocation patterns of the resources and the predetermined number of variables selected by the second variable selection means.

8. The resource allocation device of claim 7, wherein the second variable selection means is comprised of:

computation means for computing the predetermined number by doubling a number of registers assigned to the target machine;

first selection means for selecting all included variables from the resource allocation portion when a number of the selected included variables is equal to or smaller than the predetermined number; and second selection means for arranging the included variables by the variable evaluation values and selecting the predetermined number of included variables when a number of the included variables is larger than the predetermined number.

9. The resource allocation device of claim 6, wherein the holding means holds both an instruction sequence and a cost associated therewith, the held instruction sequence corresponding to a combination of an operation type, a variable type, an operand, and a storage, and wherein the operation type, the variable type, and the operand are included in an operation of the held instruction sequence and results of the operation are stored into the storage, and wherein the extraction means extracts from the instruction sequence holding means instruction sequences for each allocation pattern by referring to: (1) an operation type, a variable type, and an operand, all of which are included in the corresponding operations in the program portion, and (2) resources to which the included variables in the corresponding operation are allocated.

10. The resource allocation device of claim 6, wherein the cost table holds the extracted instruction sequences and costs thereof, the cost of each extracted instruction sequence representing a memory size needed by that extracted instruction sequence in a memory and/or the number of execution clock cycles required for execution of the extracted instruction sequence.

11. A resource allocation device for allocating variables used in operations of a program portion to resources of a target machine, comprising:

allocation pattern generating means for generating allocation patterns, each allocation pattern defining a different allocation of the variables to the resources;

instruction set generating means for generating an instruction set for each allocation pattern, each generated instruction set corresponding to the operations and allocating the variables to the resources according to one of the allocation patterns;

total cost computation means for computing a total cost of each instruction set, the total cost indicating the amount of processor resources required for execution of the instruction set; and best pattern determining means for determining an allocation pattern having a corresponding instruction set with a lowest total cost.

* * * * *

UNITED STATES PATENT AND TRADEMARK OFFICE
CERTIFICATE OF CORRECTION

PATENT NO.     : 6,425,124 B1                                              Page 1 of 1
DATED          : July 23, 2002
INVENTOR(S)    : Tominaga et al.

It is certified that error appears in the above-identified patent and that said Letters Patent is hereby corrected as shown below:

<u>Column 11,</u>
Line 51, delete "test" and insert -- best --.

Signed and Sealed this

Tenth Day of December, 2002

JAMES E. ROGAN
*Director of the United States Patent and Trademark Office*